US008340692B2

(12) United States Patent
Skarby et al.

(10) Patent No.: US 8,340,692 B2
(45) Date of Patent: Dec. 25, 2012

(54) POSITIONING WITH SEVERAL OPERATORS (75) Inventors: Ulf Skarby, Lidingo (SE); Mans Persson, Skogas (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 678 days.

(21) Appl. No.: 12/500,178

(22) Filed: Jul. 9, 2009

(65) Prior Publication Data

US 2011/0009132 A1 Jan. 13, 2011

(51) Int. Cl.
*H04W 4/00* (2009.01)
*H04W 24/00* (2009.01)
(52) U.S. Cl. ............... 455/456.5; 455/456.1; 455/456.2
(58) Field of Classification Search ............... 455/404.2, 455/456.2, 456.5
See application file for complete search history.

(56) References Cited

U.S. PATENT DOCUMENTS

| | | | | |
|---|---|---|---|---|
| 5,613,205 A | * | 3/1997 | Dufour | ............... 455/440 |
| 6,009,091 A | * | 12/1999 | Stewart et al. | ............. 455/456.5 |
| 6,404,388 B1 | * | 6/2002 | Sollenberger et al. | ........ 342/457 |
| 6,526,283 B1 | | 2/2003 | Jang | |
| 6,829,253 B1 | * | 12/2004 | Koorapaty et al. | ........... 370/514 |
| 2002/0183069 A1 | * | 12/2002 | Myr | ............... 455/456 |
| 2004/0132466 A1 | | 7/2004 | Kennedy, Jr. | |
| 2004/0219931 A1 | * | 11/2004 | Bi et al. | ............ 455/456.1 |
| 2007/0287473 A1 | * | 12/2007 | Dupray | ............ 455/456.1 |
| 2010/0331009 A1 | * | 12/2010 | Krishnamurthy et al. | . 455/456.1 |

FOREIGN PATENT DOCUMENTS

| | | |
|---|---|---|
| EP | 1962102 A2 * | 8/2008 |
| EP | 2075593 A2 | 7/2009 |
| GB | 2316580 A | 2/1998 |
| WO | 2005004528 A1 | 1/2005 |

OTHER PUBLICATIONS

International Preliminary Report on Patentability issued in International application No. PCT/SE2009/050960 on Jan. 26, 2012, 9 pages.

* cited by examiner

*Primary Examiner* — Meless N Zewdu
*Assistant Examiner* — Tangela T. Chambers
(74) *Attorney, Agent, or Firm* — Rothwell, Figg, Ernst & Manbeck, P.C.

(57) ABSTRACT

In one aspect, the invention provides apparatuses and methods for determining the location of a wireless user equipment (UE). Advantageously, the location may be determined by combining location estimates from a plurality of wireless network operators to increase accuracy.

16 Claims, 10 Drawing Sheets

POSITIONING WITH SEVERAL OPERATORS

TECHNICAL FIELD

Aspects of the invention relate to the field of wireless telecommunications. More specifically, the invention relates to estimating the physical location of a wireless user equipment.

BACKGROUND

There exist many circumstances in which it is necessary to accurately determine an individual's physical location. For example, an individual may require emergency assistance, but be unaware of his or her location. In this situation, the emergency services operator must be able to locate the individual in order to provide the proper aid. In another example, a third party (e.g., police, a family member, etc.) may need to quickly locate the individual.

One possible solution is to use the Global Positioning System ("GPS"). GPS may utilize satellite communication technology to estimate the position of a GPS receiver to within about 15 meters. This solution may also comprise the use of Assisted GPS ("A-GPS") wherein the receiver may use terrestrial resources with better computation resources and a more direct line of sight to the GPS satellites to quicken the acquisition of a GPS location estimate. However, a typical wireless communication device (a.k.a., user equipment ("UE")) does not contain the components necessary to use GPS. Furthermore, GPS does not work well if the UE lacks a relatively clear line of sight to a sizeable portion of the overhead sky.

A second solution for individuals carrying a UE may be to determine the cell in which the UE is located. Wireless networks are typically divided into geographic areas (i.e., cells) that are each serviced by a base station. When a UE is communicating via a wireless network (i.e., the UE is "connected" to that network), the UE will typically be assigned to one of these cells and transmit and receive signals via a corresponding base station. One can infer that a UE assigned to a specific cell will be located within (or within geographic proximity of) that cell. However, each cell can be quite large and so this limited information does not provide a very accurate estimate of an individual's location.

Figure 2:
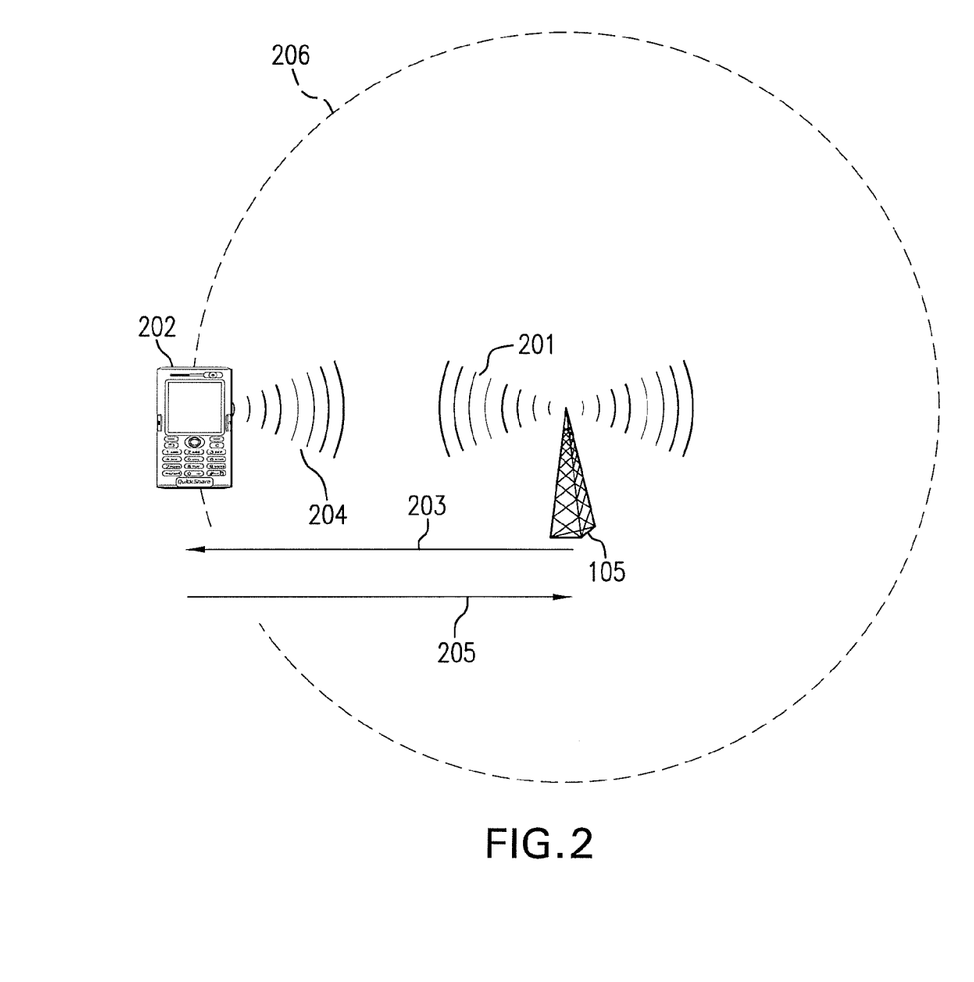
FIG. 2 illustrates UE in communication with a base station.

A farther refinement to the above estimate may be achieved by calculating the distance between a base station and the UE. As described above, when a UE is connected to a wireless network, it will typically transmit and receive signals via a designated base station 105, as shown in FIG. 2. The base station 105 may transmit a signal 201 to the UE 202. The signal 201 may be a signal designated for this purpose, or may be a signal carrying data from the wireless network to the UE 202. Because wireless transmissions travel at a finite speed (i.e., the speed of light), there is a first finite duration of time between the base station 105 transmitting signal 201 and the UE 202 receiving the signal. Because the speed of light is constant, this first duration may be used to calculate a distance 203. After the UE 202 receives the signal 201, it transmits a second signal 204 back to the base station 105. Similarly, there is a second finite duration of time between the UE 202 transmitting the signal 204 and the base station receiving the signal. This second duration may be used to calculate a distance 205. In some systems, it may be assumed that distances 203 and 205 will be roughly equal to each other. In this case, one may calculate the total duration between when the base station transmitted the signal 201 and when the base station received the signal 204 (i.e., the round trip time ("RTT")), which includes the first and second signal propagation durations as well as any internal delays within the UE (e.g., processing delays). Dividing this time by half, accounting for any internal delays within the UE, and multiplying by the speed of light will provide a distance that is the average of the distances 203 and 205. In this way the RTT can be used to determine the approximate distance between the UE 202 and the base station 105. However, because this estimate is onedimensional, this will generally only identify an arc 206 on which the UE 202 may be located. While this may be an improvement on merely identifying the cell in which the UE is located, it is still relatively imprecise.

SUMMARY

It is the object of the present invention to overcome at least some of the above described disadvantages. Accordingly, in one aspect, the present invention is able to determine a more precise estimation of a UE's location without requiring that the UE possess GPS like technology. For instance, in one embodiment, the invention is able to determine a more precise estimation of a UE's location provided that the UE is capable of communicating with two or more networks, each of which is able to independently determine an estimate of the UE's location. Advantageously, these independent location estimates are then used to derive a more precise estimation of the UE's location. For example, a first network operator operating a first network in communication with the UE may determine a first location estimate, a second network operator operating a second network in communication with the UE may determine a second location estimate, and a third network operator operating a third network in communication with the UE may determine a third location estimate. These three location estimates, each of which may define an arc on which the UE is estimated to be located, may be used to determine a more precise estimation of the UE's location. For instance, the three location estimates may be the inputs into a trilateration algorithm that produces the more precise location estimate. An advantage of this aspect of the present invention is that the invention can accurately determine the location of the UE even when the UE is indoors or under shelter or the UE does not possess GPS capabilities.

In one particular aspect, the invention provides a method performed by an overlayer for determining the location of a UE. In some embodiments, the functions of the overlayer may be performed by one of the network operators. The method may begin when the overlayer receives a first message indicating that a location of the UE should be determined. The first message may be transmitted from the UE itself (e.g., if the user of the UE requires emergency assistance), or may be transmitted from a third party (e.g., an emergency services operator, police, a search and rescue organization, a concerned family member, etc.). After receiving the first message, the overlayer may receive a location estimate of the UE from two or more network operators. After receiving the location estimates from the network operators, the overlayer may calculate an improved location estimate of the UE based upon the estimated locations received from the one or more network operators. In some embodiments, the overlayer may transmit messages to the network operators requesting location estimates. In these embodiments, the overlayer may request location estimates from a plurality of network operators simultaneously (e.g., if the overlayer cannot determine which network is currently the home network of the UE). In other embodiments, the UE or another entity may cause the network operators to provide the location estimates to the overlayer.

In some embodiments, the overlayer may select each of the network operators that will provide a location estimate. In these embodiments, before selecting a particular network operator (e.g., a network operator of a network other than the home network of the UE), the overlayer may receive a message from the UE indicating which networks the UE is capable of accessing (e.g., which networks are within transmission range of the UE, which networks operate on a base band frequency compatible with transmit and receive circuitry in the UE, etc.). The overlayer may then select the particular network operator (and any subsequent network operators) based upon this message. Furthermore, it is often the case that a UE is only capable of accessing one wireless network at a time. Therefore, in embodiments where the overlayer selects the networks, the overlayer may transmit a network transfer signal to the UE via the UE's current home network. The network transfer signal may cause the UE to reconfigure itself such that the selected network becomes the home network of the UE.

In other embodiments, the UE may select each of the network operators that will provide a location estimate. In these embodiments, the overlayer may not know which network operator will be selected by the UE. Therefore the overlayer may transmit to all of the network operators messages requesting that the network operator provide a location estimate in the case that the UE selects that network operator as the second (or subsequent) network operator.

In some embodiments, one or more of the location estimates may comprise an arc or arc segment centered on a base station situated at a known physical location, and the overlayer may calculate the improved location estimate of the UE by calculating the intersection of the arc or arc segment with another of the location estimates. The radius of the arc or arc segment may be based upon the round trip time (RTT) of a message between the base station and the UE and/or the timing advance (TA) value used by the UE.

In some embodiments, the overlayer may transmit the improved location estimate to a third party (e.g., an emergency services operator, the party that transmitted the first message, etc.). In some cases, this may comprise transmitting the improved location estimate itself. In other cases, this may comprise transmitting two or more of the location estimates received from the network operators. Alternately, any combination of this information may also be transmitted to the third party.

In another aspect, the invention provides a method performed by a UE for determining the location of the UE. The method may be initiated by some predetermined event indicating that a location of the UE should be determined. For example, the predetermined event may be a user of the UE pressing a sequence of one or more interface elements on the UE (e.g., dialing 9-1-1 or 1-1-2, selecting an option from a menu, etc.). In response to the predetermined event, the UE may transmit messages to network nodes (e.g., base stations) of two or more network operators that enable the network operators to estimate the location of the UE and send the result to the UE or the overlayer. As discussed above, in some cases, one or more of these messages may comprise a message that enables a network operator to calculate a distance between the UE and a base station that is situated at a known physical location (e.g., a return signal of a message sequence for calculating a RTT between the UE and the base station, a TA value for the UE, etc.).

In some embodiments, an overlayer may select which network operators should be utilized. When this is the case, the UE may transmit each enabling-message to the node of a network operator in response to receiving a signal from that network operator. Furthermore, as discussed above, the UE may receive a network transfer message indicating a next network operator that the UE should set as its home network. In some embodiments, the UE may also provide the overlayer with a message indicating which of the two or more network operators are currently available to the UE.

In another aspect, the invention provides an overlayer. In some embodiments, the overlayer includes a transmit and receive circuit and a data processing system. The transmit and receive circuit is operable to receive a first message indicating that a physical location of a UE capable of wireless communication with two or more network operators should be determined. The transmit and receive circuit is further operable to receive from a first network operator a first location estimate of the UE. The transmit and receive circuit is further operable to receive from a second network operator a second location estimate. The data processing system may be configured to calculate an improved location estimate of the UE using the estimated locations received from the first and second network operators.

In another aspect, the invention provides an improved UE. In some embodiments, the improved UE comprises a transmit and receive circuit and a data processing system. The data processing system may be configured such that, in response to a predetermined event indicating that a location of the UE should be determined, the data processing system causes the transmit and receive circuit to transmit from the UE to a node operated by a first network operator a first message to enable the first network operator to estimate the location of the UE. The data processing system may be further configured such that, in response to the predetermined event, the data processing system causes the transmit and receive circuit to transmit from the UE to a node operated by a second network operator a second message to enable the second network operator to estimate the location of the UE.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
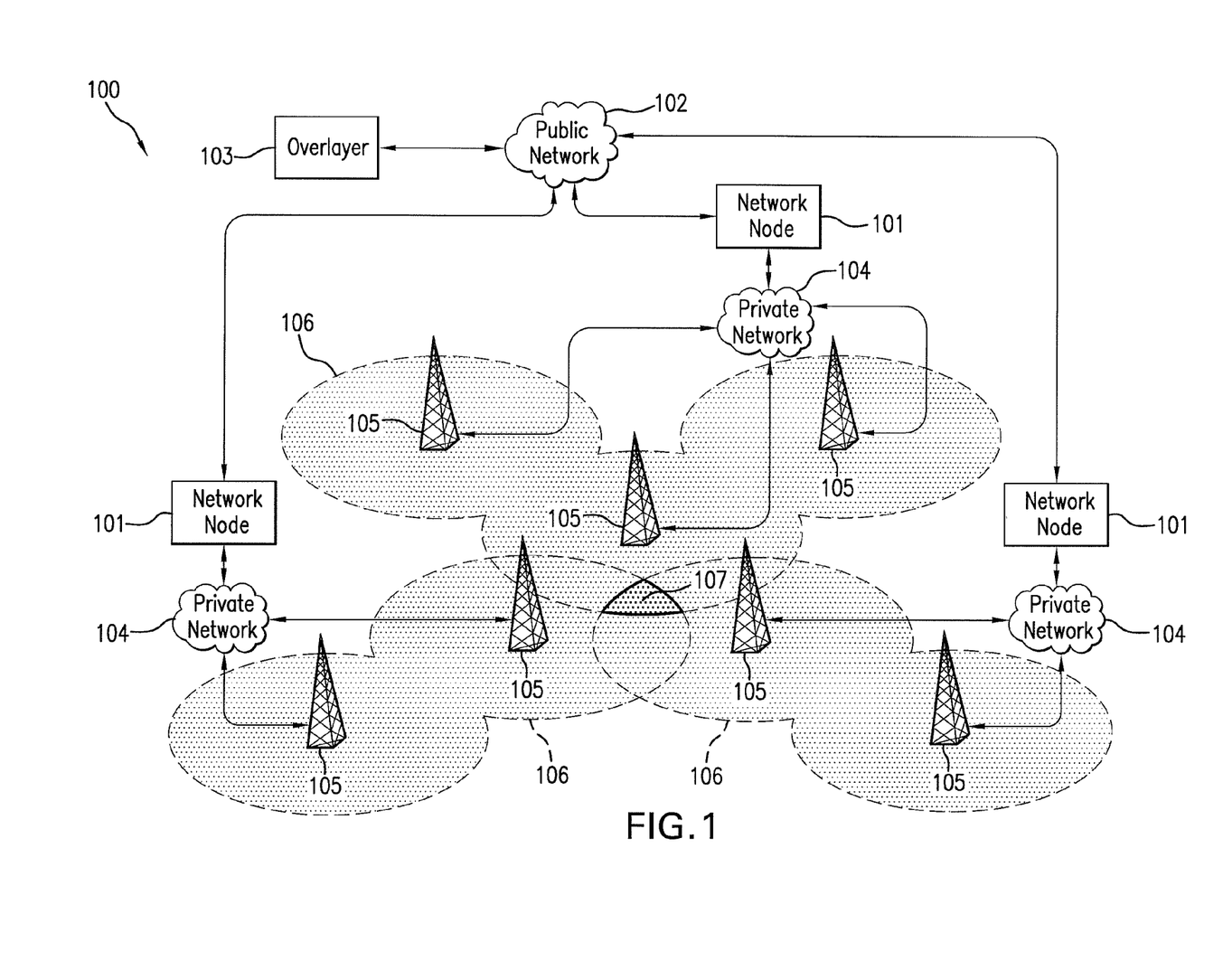
FIG. 1 illustrates a plurality of wireless communication networks.

Referring to FIG. 1, FIG. 1 illustrates a wireless communications system 100 according to one aspect of the invention. As shown in FIG. 1, the wireless communications system includes one or more network nodes 101, some of which are operated by different network operators. Furthermore, an overlayer 103 may communicate with the network nodes 101 via a public network 102. In some embodiments, the overlayer 103 may communicate with the network nodes 101 through a separate communication system, for example, dedicated communications lines (not shown) between the overlayer 103 and one or more of the network nodes 101. In some embodiments, the overlayer 103 may be one of the network nodes 101.

Each network node 101 may be connected to a private communication network 104 for communicating with one or more wireless base stations 105 (alternatively, a network node 101 may be a component of a base station 105). Typically, each wireless base station 105 may communicate with wireless user equipment (UE) within a specified area (for example, an area wherein signal strength from the wireless base station 105 is above a specified threshold). The specified area of the base stations 105 associated with a network operator defines a network coverage area 106 in which the network operator may communicate with a UE. As illustrated in FIG. 1, it is often the case that the network coverage areas 106 of two or more networks will overlap (e.g., in urban areas wherein multiple network operators provide competing services) in an overlap area 107. Thus, in some embodiments a UE located within overlap area 107 may be able to communicate with a plurality of network nodes 101 operated by two or more network operators.

Figure 3:
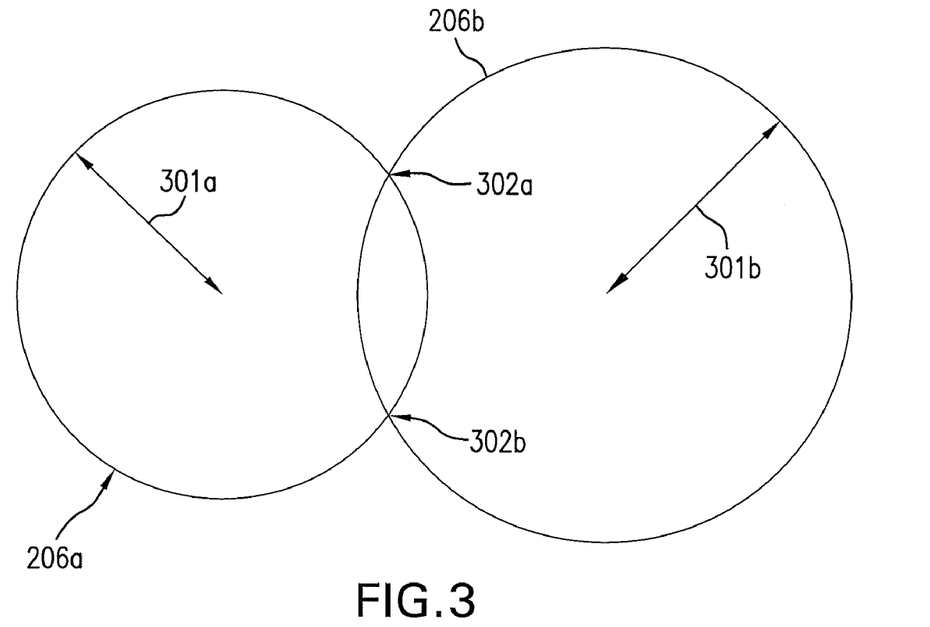
FIG. 3 illustrates an improved location estimate of a UE.

The location of a UE within the overlap area 107 may be more accurately estimated by combining information of location estimates from the two or more network operators that provide wireless service in overlap area 107. Referring to FIG. 3, FIG. 3 illustrates improved location estimates 302a, 302b of a UE 202 based upon location estimates 206a, 206b from two network operators. As illustrated in FIG. 3, each of the location estimates 206a, 206b from the network operators may comprise an arc centered about a base station 105 operated by the network operator, having a radius (e.g., radii 301a and 301b) that estimates the distance between the base station 105 and the UE 202. In some embodiments, the estimate may comprise an arc segment (e.g., if the base station antenna is anisotropic). For example, the radius may be determined based upon an RTT value between the base station 105 and the UE 202, or may be based upon a TA value for the UE. In some preferred embodiments, the location of the UE 202 is expected to be at an intersection of the location estimates 206a, 206b (i.e., the UE 202 is expected to be at a point that is consistent with both of the location estimates 206a, 206b). As illustrated in FIG. 3, the location estimates 206a, 206b intersect at two points 302a and 302b. Thus, in embodiments wherein the UE 202 can communicate with base stations 105 operated by two network operators, the estimated location of the UE 202 can be reduced from an arc (or arc segment) to one of two locations.

Figure 4:
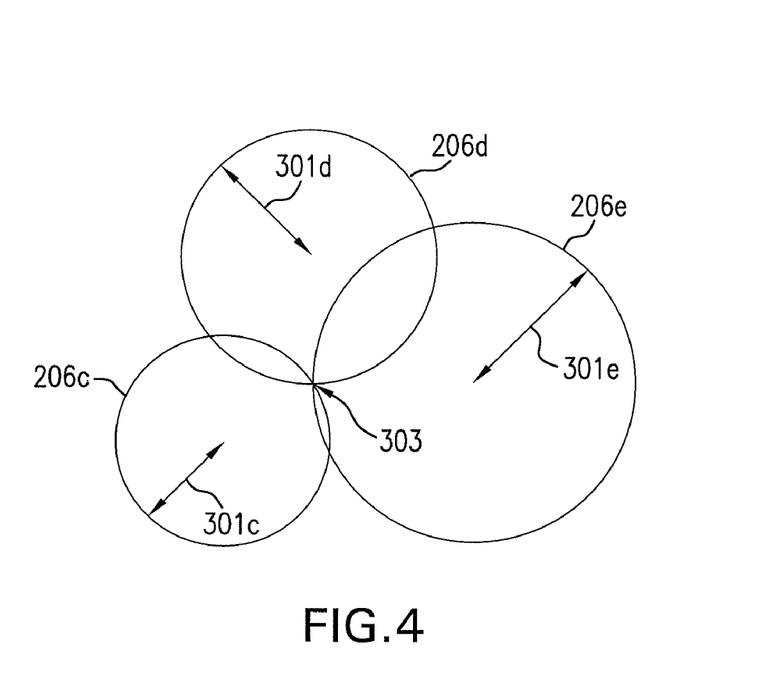
FIG. 4 illustrates an improved location estimate of a UE.

Referring to FIG. 4, FIG. 4 illustrates an improved location estimate 303 of a UE 202 based upon location estimates 206c, 206d, 206e from three network operators. As described above, in some preferred embodiments, the location of the UE 202 is expected to be at an intersection of the location estimates 206c, 206d, 206e (i.e., the UE 202 is expected to be at a point that is consistent with all three of the location estimates 206c, 206d, 206e). As illustrated in FIG. 4, the location estimates 206c, 206d, 206e intersect at one point, 303. Thus, in embodiments wherein the UE 202 can communicate with base stations 105 operated by three or more network operators, the estimated location of the UE 202 can be reduced from an arc (or arc segment) to a single location.

Figure 5:
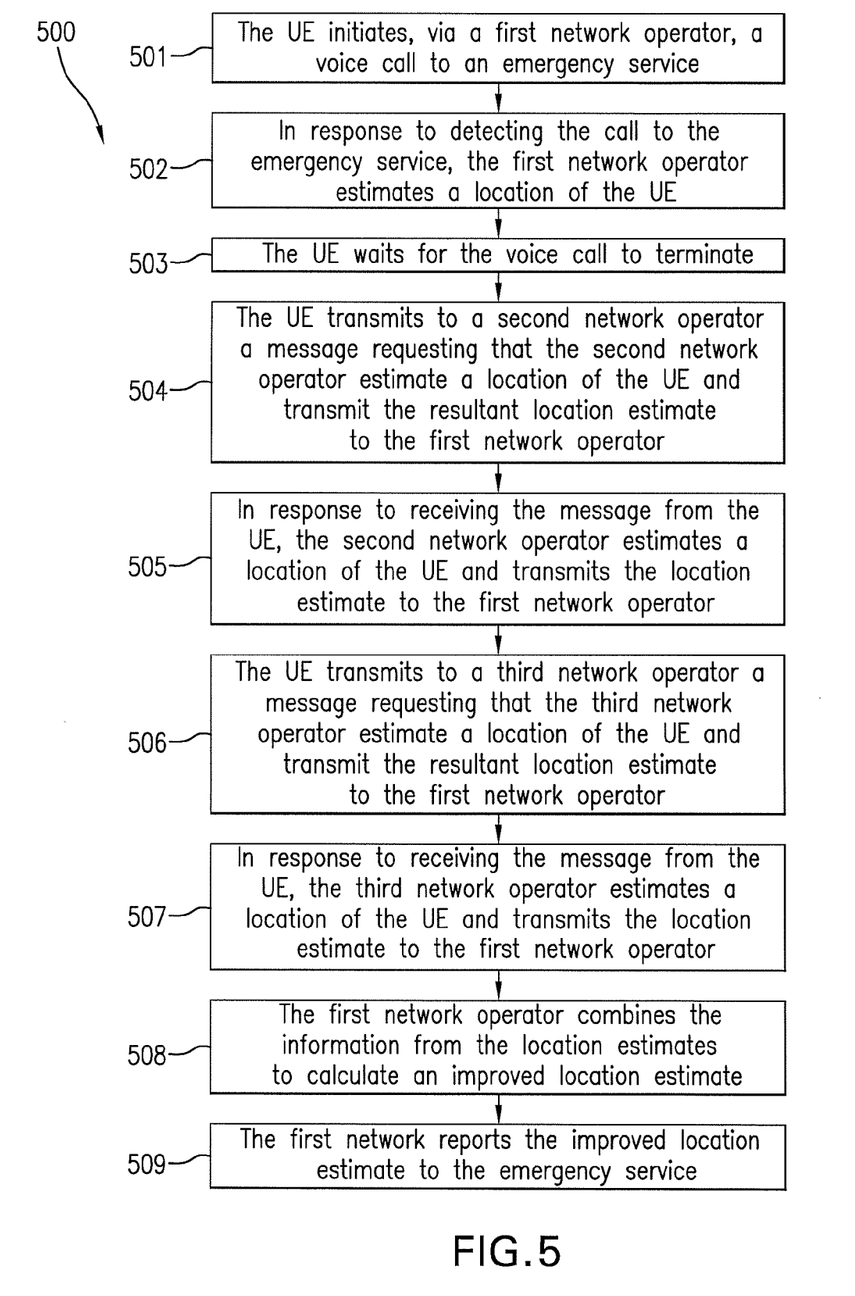
FIG. 5 is a flow chart illustrating a process for determining an improved location estimate for a UE.

Referring now to FIG. 5, FIG. 5 is a flow chart illustrating a process 500 for estimating the location of a UE 202. Steps of process 500 may be carried out by the UE 202. In some embodiments, machine executable instructions for performing steps of process 500 may be stored as software in a data storage portion of the UE 202 (see FIG. 9). As illustrated in FIG. 5, the process 500 may begin at step 501 when the UE 202 indicates that a location estimate should be performed. In some embodiments, this may be indicated by the UE 202 placing a standard voice call over the private network 104 of a first network operator to an emergency services operator (e.g., "9-1-1," "1-1-2," police, etc.). In other embodiments, the indication may comprise the user selecting a sequence of one or more interface elements on the UE 202 (e.g., pushing a button, selecting a menu option, etc.). In still further embodiments, the indication may comprise a signal transmitted from an overlayer 103.

In some embodiments, the first network operator may operate the home network of the UE. In other embodiments, the first network operator may be selected based upon other criteria (e.g., signal strength detected by the UE 202).

In response to detecting the indication from step 501 (e.g., detecting that the UE 202 placed a call to an emergency services operator), the first network operator will estimate a location of the UE (step 502).

As illustrated in FIG. 5, in some embodiments the UE waits until a pending voice call terminates (step 503). This may ensure that the user of the UE is able to communicate all of the necessary information for the call. For example, a user may need to communicate his or her situation with an emergency services operator in detail to receive the proper aid.

At step 504, after the voice call terminates, the UE transmits to a base station operated by a second network operator a message requesting that the second network operator estimate a location of the UE and transmit that location estimate to the first network operator.

In response to receiving the message from step 504, the second network operator estimates a location of the UE and transmits that location estimate to the first network operator (step 505). Step 505 may be performed by a network node 101 operated by the second network operator.

At step 506, the UE transmits to a base station operated by a third network operator a message requesting that the third network operator estimate a location of the UE and transmit that location estimate to the first network operator.

In response to receiving the message from step 506, the third network operator estimates a location of the UE and transmits that location estimate to the first network operator (step 507). Step 507 may be performed by a network node 101 operated by the third network operator.

At step 508, after receiving the location estimates from the second and third network operators, the first network operator combines the information from all of the location estimates to calculate an improved location estimate of the UE.

At step 509, the first network operator may communicate to a remote operator (e.g., an emergency services operator) the improved location estimate from step 508.

In the above manner, an accurate estimate of UE 202's location may be obtained.

Figure 6:
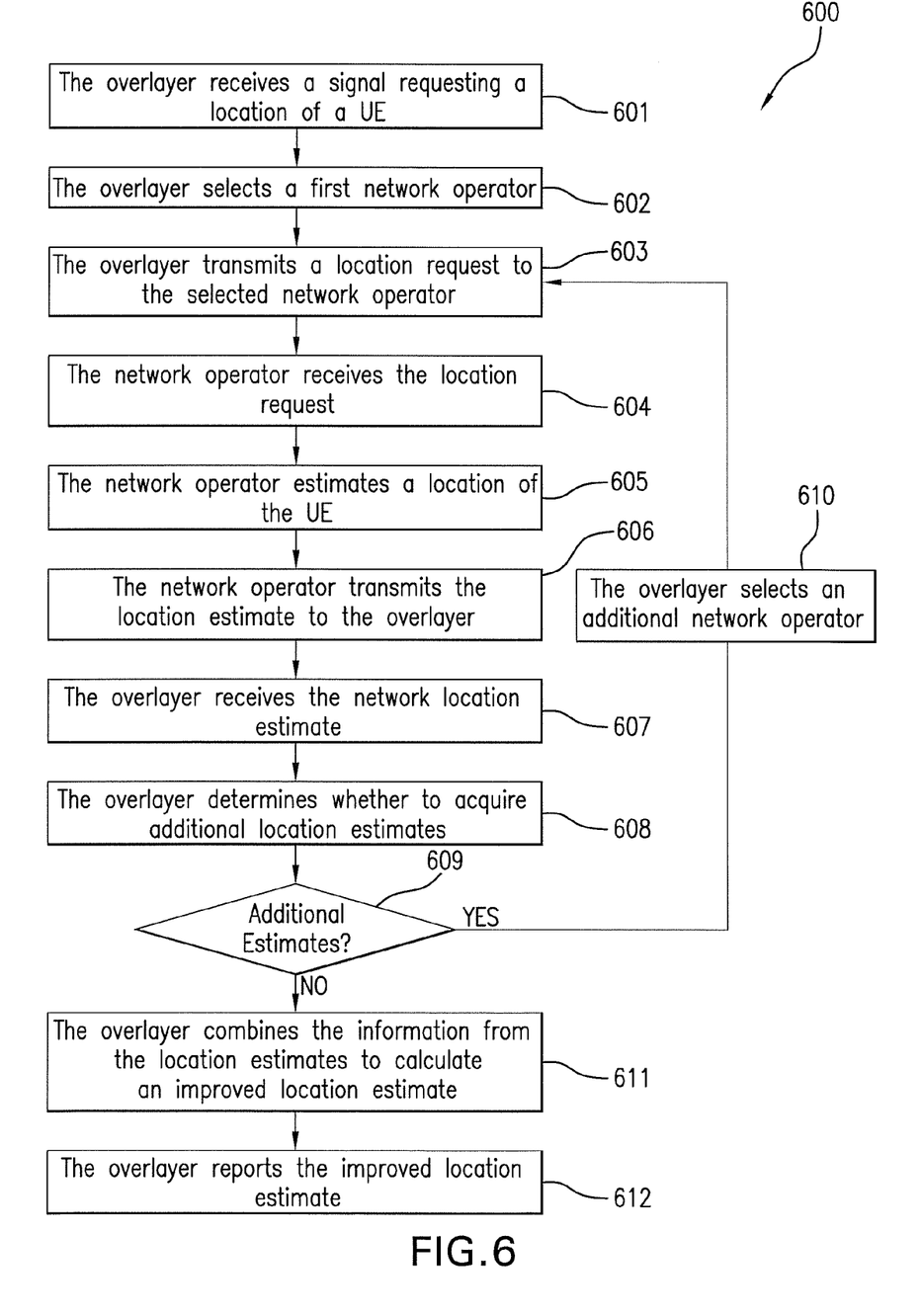
FIG. 6 is a flow chart illustrating a process for determining an improved location estimate for a UE.

Referring now to FIG. 6, FIG. 6 is a flow chart illustrating a method 600 of estimating a location of UE 202. In some embodiments, steps of process 600 may be performed by an overlayer 103. In some embodiments, the overlayer 103 may be one of the network nodes 101.

The process 600 may begin at step 601 when the overlayer 103 receives a signal requesting a location of the UE 202. In some embodiments, this signal may be communicated by a first network operator after the UE 202 places a voice call to an emergency services operator. In other embodiments, the signal may be received by another entity that needs to locate the UE 202 (e.g., if police or rescue services need to locate a missing person). In still further embodiments, the signal may be communicated from the UE 202 in response to a user selecting a sequence of one or more interface elements on the UE 202 (e.g., pushing a button, selecting a menu option, etc.). In response to receiving the signal in step 601, the overlayer 103 selects a network operator (step 602). In a preferred embodiment, the network operator selected at step 602 is the operator associated with the home network of the UE 202.

In some embodiments, the UE 202 may be capable of contacting emergency services via any available network if the home network of the UE 202 is not available. In these embodiments, step 601 may occur when the UE 202 places a voice call to an emergency services operator using a network different than the UE's home network. However the UE 202 may be configured to only accept incoming calls and pages via the home network of the UE 202. Therefore, in some embodiments step 602 may comprise the overlayer 103 selecting the network operator of the home network of the UE 202 regardless of which network operator detected the call to emergency services.

In other embodiments, step 602 may comprise the overlayer 103 selecting a network operator other than the operator of the home network of the UE 202 (e.g., the overlayer 103 may select the network operator that was used to place a call to emergency services). In these embodiments, the overlayer 103 may transmit a message to the UE 202 via the home network of the UE 202 that causes the UE 202 to be configured so as to accept communications from the selected network. In some embodiments, the reconfiguration may comprise setting the home network of the UE 202 to the selected network.

At step 603, the overlayer 103 transmits a location request to the selected network operator, which is received by the network node 101 of the selected network operator at step 604.

In response to receiving the request, the first network operator estimates a location of the UE 202 (step 605) and transmits that location estimate to the overlayer 103 (step 606). Steps 605 and 606 may be performed by a network node 101 operated by the first network operator At step 607, the overlayer 103 receives the location estimate from the selected network operator and determines whether more locations estimates are required to determine an accurate location of the UE 202 (step 608).

In the case that additional estimates are necessary, the overlayer 103 may select another network operator (step 610). After selecting another network operator, the overlayer 103 returns to step 603 to acquire a location estimate from the new network operator.

In the case that additional estimates are not necessary, at step 611 the overlayer 103 combines the information from all of the location estimates to calculate an improved location estimate of the UE 202. At step 612, the overlayer 103 may report the improved location estimate to a third party (e.g., the party that generated the signal received at step 601).

Figure 7:
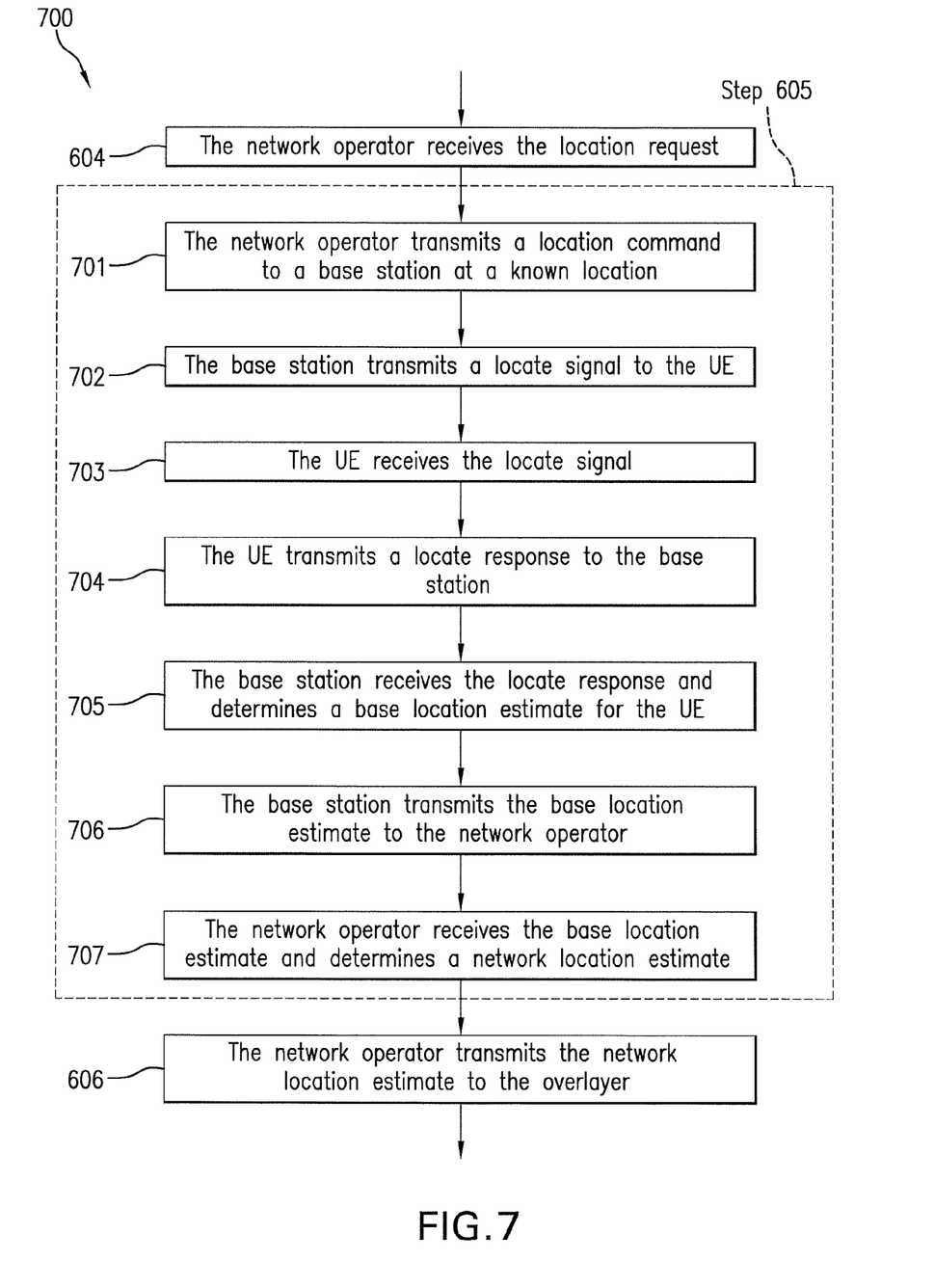
FIG. 7 is a flow chart illustrating a process for estimating a location of a UE vis-à-vis a wireless base station.

Referring now to FIG. 7, FIG. 7 is a flow chart illustrating a process 700 for implementing step 605. At step 701, the network node 101 transmits a location command to one of the base stations 105 belonging to that operator's network 104. This base station 105 may be in a known physical location.

In response to receiving the locate command, the base station 105 may transmit a locate signal to the UE 202 (step 702). In some embodiments, this locate signal may comprise one half of an RTT sequence. In other embodiments, the locate signal may comprise a portion of a TA synchronization sequence.

At step 703, the UE 202 receives the locate signal and, at step 704, transmits a locate response back to the base station.

At step 705, the base station 105 receives the locate response and determines a location estimate for the UE 202. In some embodiments, the location estimate may comprise an arc or arc segment centered about the base station 105 having a radius equal to one half of the RTT times the speed of light. The base station 105 then transmits this estimate (or the radius of the estimate) to the network operator 101 (step 706).

At step 707, the network node 101 receives the location estimate from the base station 105 and determines a network location estimate. In some embodiments, this may comprise using the estimate from the base station to form a circle having a radius equal to one half of the RTT times the speed of light around the known location of the base station. In other embodiments, the base station 105 may be aware of its own location and provide this in the location estimate.

Figure 8:
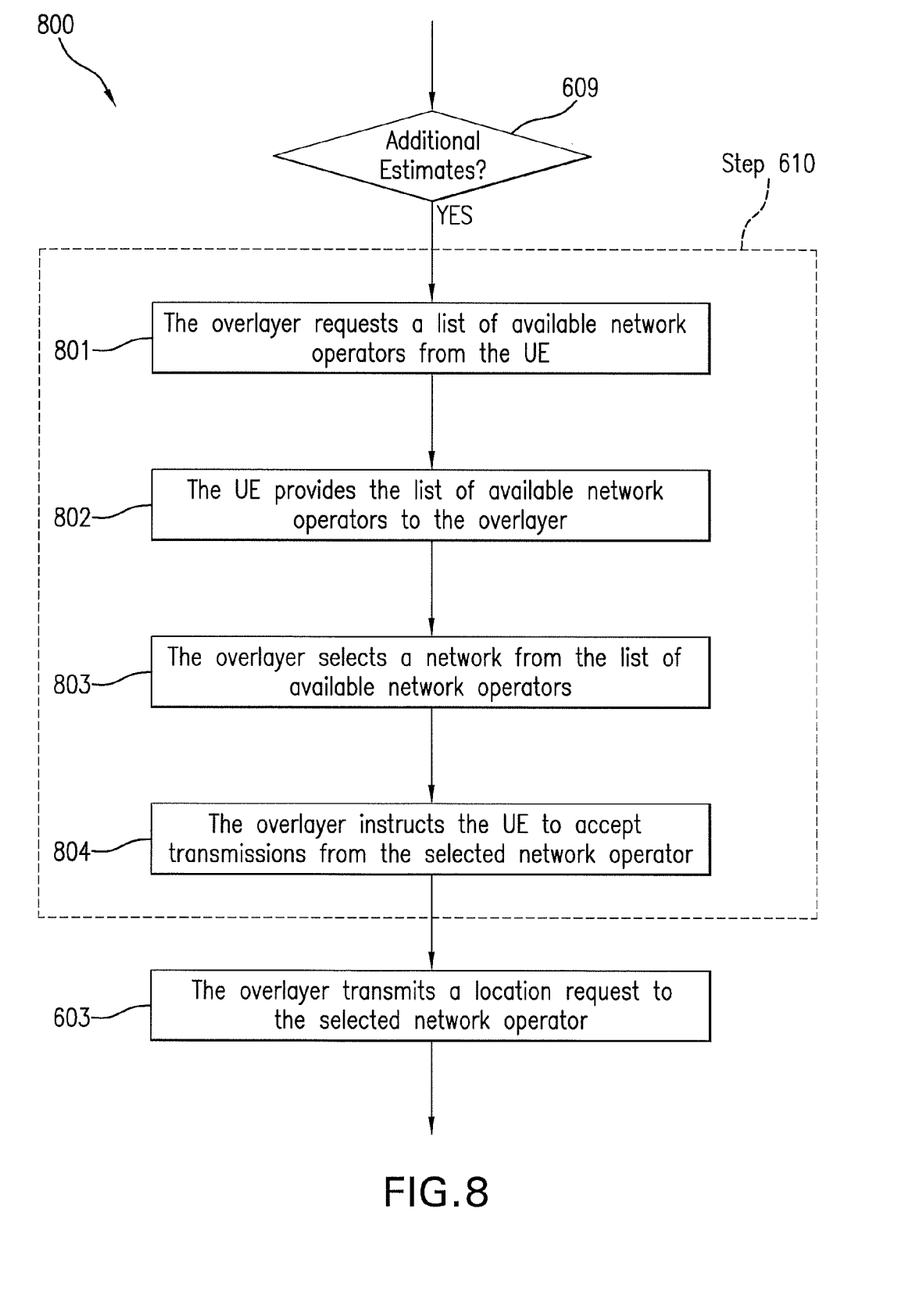
FIG. 8 is a flow chart illustrating a process 800 for selecting a network and configuring a UE to communicate via that network.

Referring now to FIG. 8, FIG. 8 is a flow chart illustrating a process for implementing step 610. Process 800 may begin at step 801, where the overlayer 103 requests from the UE a list of networks operators whose networks 104 the UE 202 is capable of accessing. In some embodiments, the UE 202 may store a list of suitable networks operators. In other embodiments, the UE may dynamically determine the list of network operators based upon current conditions of the UE 202 (e.g., what networks are within transmission range of the UE 202).

At step 802, the UE 202 may provide the list of available networks to the overlayer 103.

At step 803, the overlayer 103 selects one of the available networks as the next network.

At step 804, the overlayer 103 transmits a message to the UE 202 that causes the UE 202 to be configured so as to communicate with the selected network. In some embodiments, the reconfiguration may comprise setting the home network of the UE 202 to the selected network and disconnecting the UE 202 from the current network.

In other embodiments, step 610 may be implemented by the overlayer 103 transmitting to the UE 202 a signal requesting that the UE 202 select a next network from the networks available to the UE.

Figure 9:
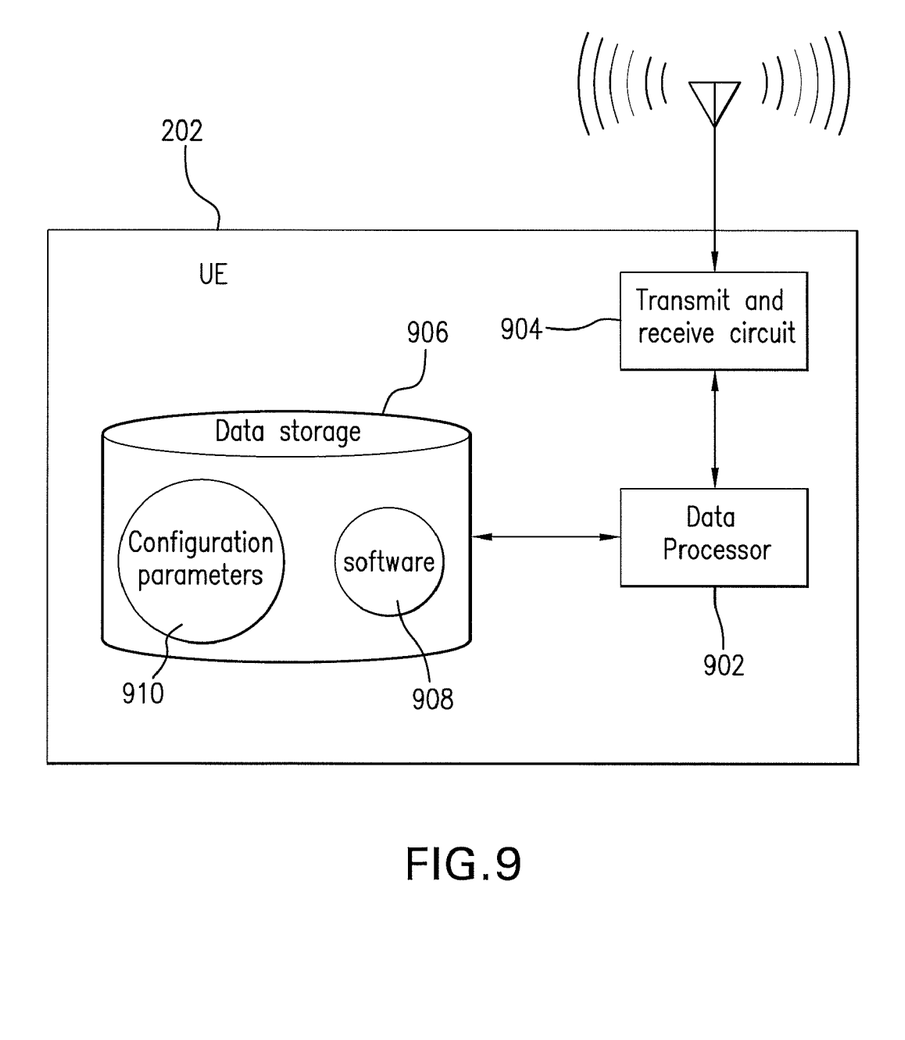
FIG. 9 is a block diagram of a UE.

Referring now to FIG. 9, FIG. 9 is a functional block diagram of the UE 202 according to some embodiments of the invention. As shown, the UE 202 may comprise a data processing system 902 (e.g., one or more microprocessors, one or more integrated circuits, such as an application specific integrated circuit (ASIC), Field-programmable gate arrays (FPGAs), etc. and any combination of these), a data storage system 906 (e.g., one or more non-volatile storage devices) and computer software 908 stored on the storage system 906. Configuration parameters 910 (e.g., a list of available networks) may also be stored in storage system 906. The UE 202 also includes transmit/receive (Tx/Rx) circuitry 904 for transmitting data to and receiving data from base stations 105. The software 908 is configured such that when the processor 902 executes the software 908, the UE 202 performs steps described above (e.g., steps describe above with reference to the flow charts). For example, software 908 may include: (1) computer instructions for transmitting from the UE 202 to a node (e.g., a base station 105) operated by a first network operator a first message to enable the first network operator to estimate the location of the UE 202 in response to a predetermined event indicating that a location of the UE 202 should be determined; and (2) computer instructions for transmitting from the UE 202 to a node (e.g., a base station 105) operated by a second network operator a second message to enable the second network operator to estimate the location of the UE 202 in response to a predetermined event indicating that a location of the UE 202 should be determined. In other embodiments, data processing system 902 is configured to perform steps described above without the need for software 908. That is, for example, data processing system 902 may consist merely of one or more ASICs. Hence, features of the present invention described above may be implemented in hardware and/or software.

Figure 10:
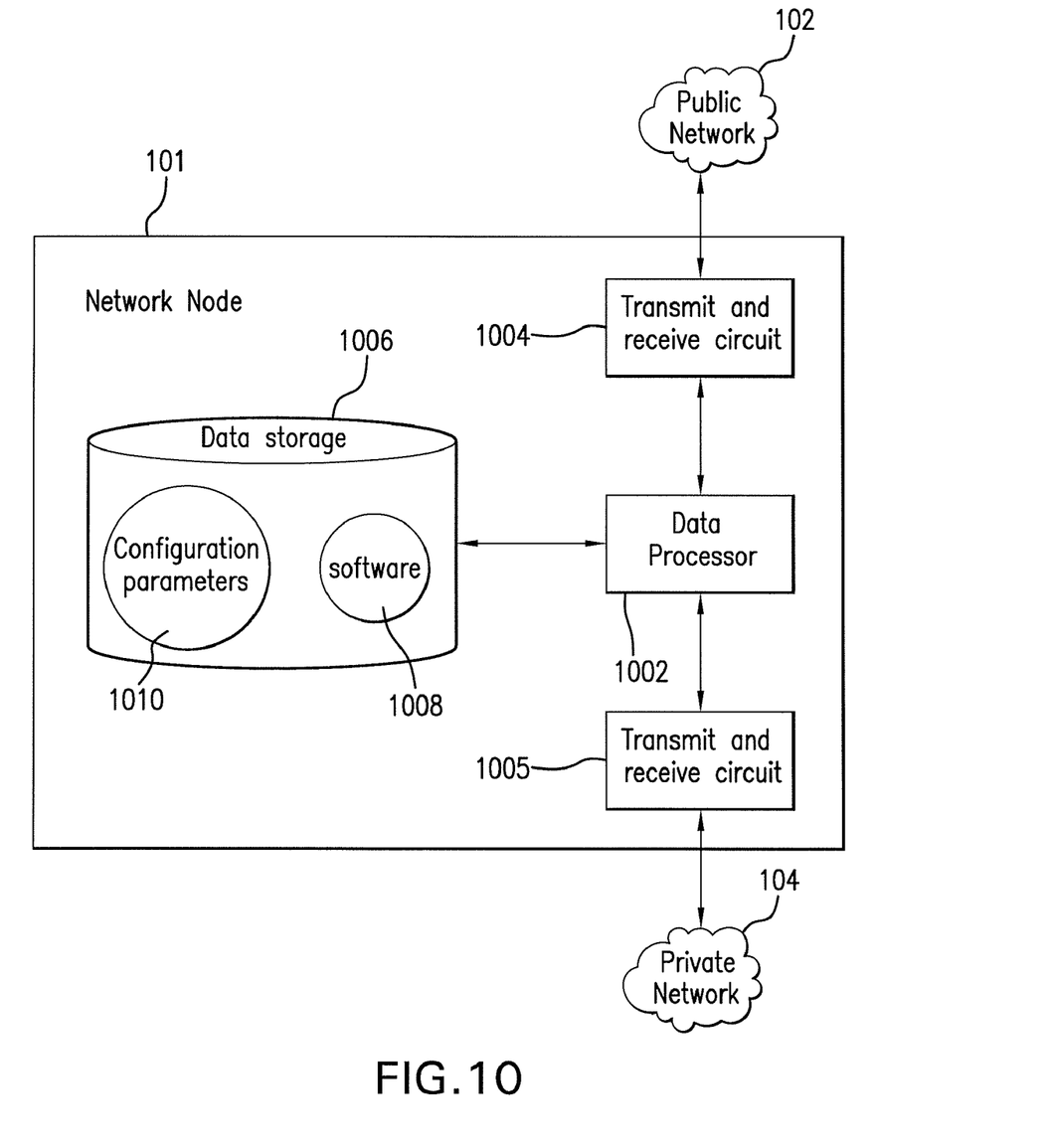
FIG. 10 is a block diagram of a network node.

Referring now to FIG. 10, FIG. 10 is a functional block diagram of the network node 101 according to some embodiments of the invention. As shown, the network node 101 may comprise a data processing system 1002 (e.g., one or more microprocessors, one or more integrated circuits, such as an application specific integrated circuit (ASIC), Field-programmable gate arrays (FPGAs), etc. and any combination of these), a data storage system 1006 (e.g., one or more non-volatile storage devices) and computer software 1008 stored on the storage system 1006. Configuration parameters 1010 may also be stored in storage system 1006. The network node 101 also includes transmit/receive (Tx/Rx) circuitry 1004 for transmitting data to and receiving data from a public network 102 (e.g., the Internet) and transmit/receive (Tx/Rx) circuitry 1005 for transmitting data to and receiving data from a private network of a network operator. In some embodiments, transmits and receive circuitry 1004 and transmit and receive circuitry 1005 may comprise the same physical elements. The software 1008 is configured such that when the processor 1002 executes the software 1008, the network node 101 performs steps described above (e.g., steps describe above with reference to the flow charts). For example, software 1008 may include: (1) computer instructions for receiving a first message indicating that a location of the UE 202 should be determined; (2) computer instructions for receiving from a first network operator a first location estimate of the UE 202; (3) computer instructions for receiving from a second network operator a second location estimate of the UE 202; and (4) computer instructions for calculating an improved location estimate of the UE 202 using the estimated locations received from the first and second network operators. In other embodiments, data processing system 902 is configured to perform steps described above without the need for software 1008. That is, for example, data processing system 1002 may consist merely of one or more ASICs. Hence, features of the present invention described above may be implemented in hardware and/or software.

Figure 11:
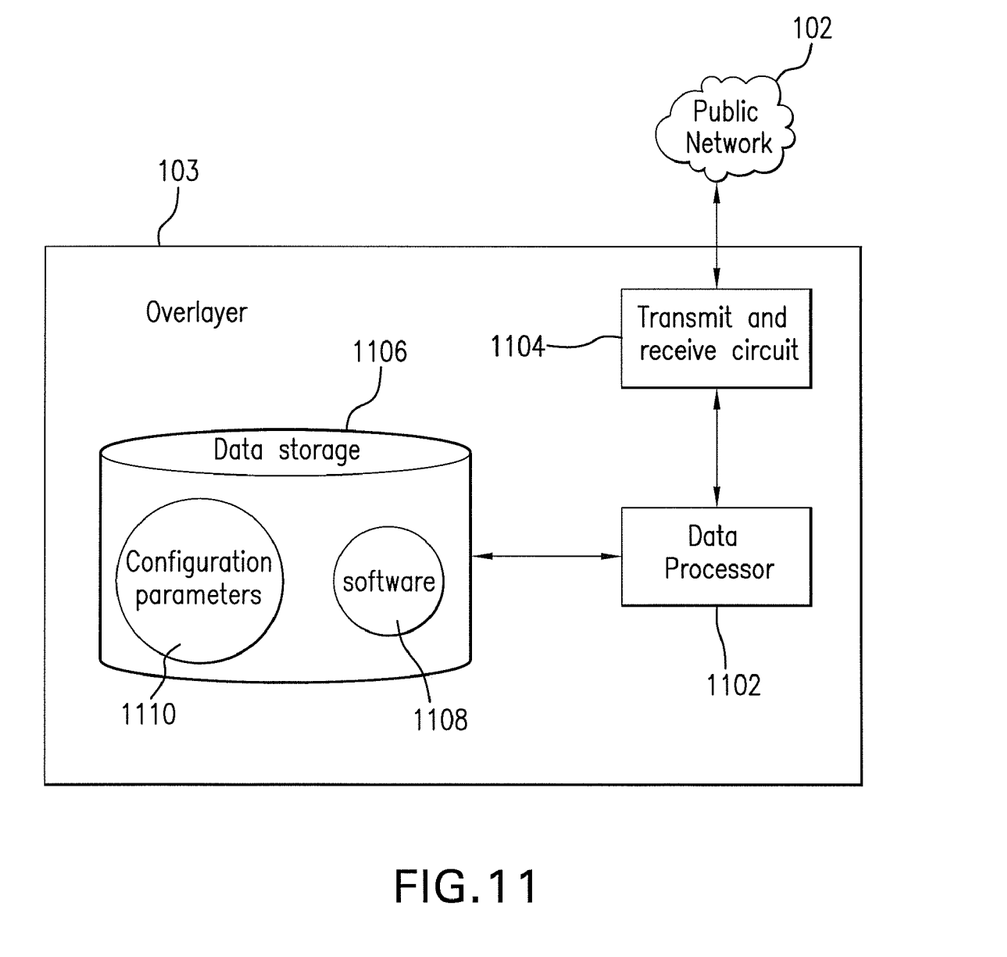
FIG. 11 is a block diagram of an overlayer.

Referring now to FIG. 11, FIG. 11 is a functional block diagram of an overlayer 103 according to some embodiments of the invention. As shown, the overlayer 103 may comprise a data processing system 1102 (e.g., one or more microprocessors, one or more integrated circuits, such as an application specific integrated circuit (ASIC), Field-programmable gate arrays (FPGAs), etc. and any combination of these), a data storage system 1106 (e.g., one or more non-volatile storage devices) and computer software 1108 stored on the storage system 1106. Configuration parameters 1110 (e.g., a list of wireless network operators 101) may also be stored in storage system 1106. The overlayer 103 also includes transmit/receive (Tx/Rx) circuitry 1104 for transmitting data to and receiving data from the network operators. The software 1108 is configured such that when the processor 1102 executes the software 1108, the overlayer 103 performs steps described above (e.g., steps describe above with reference to the flow charts). For example, software 1108 may include: (1) computer instructions for receiving a first message indicating that a location of the UE 202 should be determined; (2) computer instructions for receiving from a first network operator a first location estimate of the UE 202; (3) computer instructions for receiving from a second network operator a second location estimate of the UE 202; and (4) computer instructions for calculating an improved location estimate of the UE 202 using the estimated locations received from the first and second network operators. In other embodiments, data processing system 1102 is configured to perform steps described above without the need for software 1108. That is, for example, data processing system 1102 may consist merely of one or more ASICs. Hence, features of the present invention described above may be implemented in hardware and/or software.

While various embodiments of the present invention have been described above, it should be understood that they have been presented by way of example only, and not limitation. Thus, the breadth and scope of the present invention should not be limited by any of the above described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining the physical location of a user equipment (UE) capable of wireless communication with two or more network operators, comprising the steps of:
    (a) receiving a first message indicating that a location of the UE should be determined;
    (b) receiving from a first network operator a first location estimate of the UE;
    (c) receiving from a second network operator a second location estimate of the UE;
    (d) calculating an improved location estimate of the UE using the estimated locations received from the first and second network operators;
    (e) after step (b), determining whether the UE is currently configured to communicate with the second network operator; and
    (f) after step (e), in the case that the UE is not currently configured to communicate with the second network operator, transmitting to the UE via the first network operator a network transfer signal indicating that the configuration of the UE should be adjusted to enable communication with the second network operator.

2. The method of claim 1, wherein
   at least one of the location estimates comprises an arc or arc segment centered on a base station situated at a known physical location; and
   the step of calculating an improved location estimate of the UE comprises calculating the intersection of the arc or arc segment with the other estimated location.

3. The method of claim 1, further comprising a steps of:
    (e) before step (b), transmitting to the first network operator a message requesting a location estimate of the UE; and
    (f) before step (c), transmitting to the second network operator a message requesting a location estimate of the UE.

4. The method of claim 1, further comprising the step of:
(g) before step (f), receiving from the UE a message indicating which of the two or more network operators are currently available to the UE,
wherein the second network operator is selected from among the network operators that are currently available to the UE.

5. The method of claim 1, wherein the second network operator is selected by the UE from among the two or more network operators, and the method further comprises:
(e) transmitting to each of the two or more network operators a message requesting that the network operator provide a location estimate in the case that the UE selects that network operator as the second network operator.

6. The method of claim 1, further comprising the step of:
(e) transmitting to a remote operator a message comprising at least one of the improved location estimate of the UE and one or more of the location estimates received from the network operators.

7. The method of claim 1, wherein the first message is transmitted from a remote operator.

8. The method of claim 1, wherein the first message is transmitted from the UE.

9. An overlayer, comprising:
a transmit and receive circuit operable to:
receive a first message indicating that a physical location of a user equipment (UE) capable of wireless communication with two or more network operators should be determined,
receive from a first network operator a first location estimate of the UE, and
receive from a second network operator a second location estimate of the UE; and
a data processing system that is configured to calculate an improved location estimate of the UE using the estimated locations received from the first and second network operators, wherein
the data processing system is further configured such that, in response to the overlayer receiving the first location estimate, the data processing system:
determines whether the UE is currently configured to communicate with the second network operator; and
in the case that the UE is not currently configured to communicate with the second network operator, cause the transmit and receive circuit to transmit to the UE via the first network operator a network transfer signal indicating that the configuration of the UE should be adjusted to enable communication with the second network operator.

10. The overlayer of claim 9, wherein
at least one of the location estimates comprises an arc or arc segment centered on a base station situated at a known physical location; and
calculating an improved location estimate of the UE comprises calculating the intersection of the arc or arc segment with the other estimated location.

11. The overlayer of claim 9, wherein the transmit and receive circuit is further operable to:
transmit to the first network operator a message requesting a location estimate of the UE; and
transmit to the second network operator a message requesting a location estimate of the UE.

12. The overlayer of claim 11, wherein the transmit and receive circuit is further operable to:
receive from the UE a message indicating which of the two or more network operators are currently available to the UE, and
the data processing system is configured to select the second network operator from among the network operators that are currently available to the UE.

13. The overlayer of claim 9, wherein the second network operator is selected by the UE from among the two or more network operators, and the transmit and receive circuit is further operable to transmit to each of the two or more network operators a message requesting that the network operator provide a location estimate in the case that the UE selects that network operator as the second network operator.

14. The overlayer of claim 9, wherein the transmit and receive circuit is further operable to:
transmit to a remote operator a message comprising at least one of the improved location estimate of the UE and one or more of the location estimates received from the network operators.

15. The overlayer of claim 9, wherein the first message is transmitted from a remote operator.

16. The overlayer of claim 9, wherein the first message is transmitted from the UE.

* * * * *

UNITED STATES PATENT AND TRADEMARK OFFICE
CERTIFICATE OF CORRECTION

PATENT NO. : 8,340,692 B2
APPLICATION NO. : 12/500178
DATED : December 25, 2012
INVENTOR(S) : Skarby et al.

It is certified that error appears in the above-identified patent and that said Letters Patent is hereby corrected as shown below:

On the Title Page, in Field (75), under "Inventors", in Column 1, Line 1, delete "Lidingo (SE);" and insert -- Lidingö (SE); --, therefor.

On the Title Page, in Field (75), under "Inventors", in Column 1, Line 2, delete "Skogas (SE)" and insert -- Skogås (SE) --, therefor.

In Column 1, Line 45, delete "farther" and insert -- further --, therefor.

In Column 7, Line 49, delete "operator" and insert -- operator. --, therefor.

In Column 10, Line 61, in Claim 3, delete "a steps" and insert -- the steps --, therefor.

Signed and Sealed this
Second Day of April, 2013

Teresa Stanek Rea
*Acting Director of the United States Patent and Trademark Office*